US010560945B2

(12) United States Patent
Sanderovich et al.

(10) Patent No.: US 10,560,945 B2
(45) Date of Patent: Feb. 11, 2020

(54) MODE INDICATION FOR WIRELESS DEVICES

(71) Applicant: QUALCOMM Incorporated, San Diego, CA (US)

(72) Inventors: Amichai Sanderovich, Atlit (IL); Alecsander Petru Eitan, Haifa (IL)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/406,654

(22) Filed: Jan. 13, 2017

(65) Prior Publication Data

US 2017/0208595 A1    Jul. 20, 2017

Related U.S. Application Data

(60) Provisional application No. 62/279,637, filed on Jan. 15, 2016.

(51) Int. Cl.
   *H04W 72/04*  (2009.01)
   *H04L 1/00*   (2006.01)
   *H04L 27/34*  (2006.01)

(52) U.S. Cl.
   CPC .......... *H04W 72/0466* (2013.01); *H04L 1/00* (2013.01); *H04L 1/0078* (2013.01); *H04L 27/34* (2013.01)

(58) Field of Classification Search
   None
   See application file for complete search history.

(56) References Cited

U.S. PATENT DOCUMENTS

| 9,831,983 B2 | 11/2017 | Sampath et al. |
| 2006/0182017 A1* | 8/2006 | Hansen ............... H04B 7/02 370/208 |
| 2007/0160040 A1* | 7/2007 | Kwon ............... H04L 47/10 370/389 |
| 2011/0096797 A1* | 4/2011 | Zhang ............... H04B 7/0669 370/474 |
| 2011/0222486 A1 | 9/2011 | Hart et al. |
| 2012/0281774 A1 | 11/2012 | Lee et al. |
| 2016/0014729 A1 | 1/2016 | Wentink et al. |
| 2016/0286011 A1* | 9/2016 | Kasher ............... H04L 69/22 |
| 2017/0013507 A1* | 1/2017 | Lee ............... H04B 7/0413 |
| 2017/0111139 A1* | 4/2017 | Greenberg ............ H04L 1/0009 |

(Continued)

FOREIGN PATENT DOCUMENTS

| JP | 2013504248 A | 2/2013 |
| JP | 2013511217 A | 3/2013 |
| JP | 2013515435 A | 5/2013 |

(Continued)

OTHER PUBLICATIONS

International Search Report and Written Opinion—PCT/US2017/013594—ISA/EPO—Apr. 3, 2017.

(Continued)

*Primary Examiner* — Donald L Mills
(74) *Attorney, Agent, or Firm* — Patterson & Sheridan, L.L.P.

(57) ABSTRACT

Certain aspects of the present disclosure relate to methods and apparatus for wireless communication. More particularly, aspects of the present disclosure generally relate to techniques for providing an indication of an operating mode involving an enhanced modulation scheme.

26 Claims, 14 Drawing Sheets

(56) References Cited

U.S. PATENT DOCUMENTS

2017/0280462 A1*  9/2017  Chun .................. H04W 72/082
2018/0234118 A1*  8/2018  Xi ..................... H03M 13/2707

FOREIGN PATENT DOCUMENTS

| JP | 2015521412 A | 7/2015 |
|----|--------------|--------|
| WO | 2012057959 A1 | 5/2012 |
| WO | 2015040051 A1 | 3/2015 |
| WO | 2017077665 A1 | 5/2017 |

OTHER PUBLICATIONS

Perahia E., et al., "Next Generation Wireless LANs (passage)", 2013, Cambridge University Press, XP002744328, vol. 2, p. 62-p. 63, p. 68-p. 69, p. 80-p. 85, p. 222, p. 244, p. 271-p. 272.
Halford S., et al., "OFDM as a High Rate Extension to the CCK-based 802.11b Standard", IEEE 802.11-01/0154r0, Mar. 12, 2001, Slides 1-35.
Taiwan Search Report—TW106101351—TIPO—Oct. 2, 2019.

* cited by examiner

| Option | CRs supported | Reserved bits used | Scrambler values reduction factor | Note |
|---|---|---|---|---|
| 1 | 5/8, 3/4, 13/16 | 1 | 3/4 | |
| 2 | 5/8, 3/4, 13/16 | 0 | 4 | Uses TX capabilities information |
| 3 | 5/8, 3/4, 13/16, 7/8 | 1 | 16 | |
| 4 | 5/8, 3/4, 13/16, 7/8 | 1 | 8 | One superfluous SC symbol added in some cases (with probability of 50%) |
| 5 | 5/8, 3/4, 13/16, 7/8 | 0 | 16 | Uses TX capabilities information |
| 6 | 5/8, 3/4, 13/16, 7/8 | 0 | 8 | One superfluous SC symbol added in some cases (with probability of 50%) |

800

| Value | Code Rate |
|---|---|
| 0 | 64QAM Not Supported |
| 1 | 5/8 |
| 2 | 3/4 |
| 3 | 13/16 |
| 4 | 7/8 |

| Value | Code Rate |
|---|---|
| X<13 | 64QAM Not Supported |
| 13 | 5/8 |
| 14 | 3/4 |
| 15 | 13/16 |
| 16 | 7/8 |

| Value | Meaning |
|---|---|
| 00 | 11ad, $\pi/4$-QPSK, CR=3/4 |
| 01 | 11ad+, $\pi/4$-64QAM, CR=3/4, La=3xL |
| 10 | 11ad+, $\pi/4$-64QAM, CR=3/4, La=3xL-1 |
| 11 | 11ad+, $\pi/4$-64QAM, CR=3/4, La=3xL-2 |

| Value | Meaning |
|---|---|
| 0000 | 11ad, $\pi/4$-QPSK, CR=3/4 |
| 0001 | 11ad+, $\pi/4$-64QAM, La=3xL, CR as in MCS table |
| 0010 | 11ad+, $\pi/4$-64QAM, La=3xL-1, CR as in MCS table |
| 0011 | 11ad+, $\pi/4$-64QAM, La=3xL-2, CR as in MCS table |
| 0100 | 11ad+, $\pi/4$-64QAM, CR=7/8, La=3.5xL |
| 0101 | 11ad+, $\pi/4$-64QAM, CR=7/8, La=3.5xL-1 |
| 0110 | 11ad+, $\pi/4$-64QAM, CR=7/8, La=3.5xL-2 |
| 0111 | 11ad+, $\pi/4$-64QAM, CR=7/8, La=3.5xL-3 |
| 1000 | 11ad+, $\pi/4$-64QAM, CR=7/8, La=3.5xL-4 |
| 1001 | 11ad+, $\pi/4$-64QAM, CR=7/8, La=3.5xL-5 |
| 1010 | 11ad+, $\pi/4$-64QAM, CR=7/8, La=3.5xL-6 |
| Other | Not used |

For MCS=4

| Value | Meaning |
|---|---|
| 000 | 11ad, π/4-BPSK, CR=3/4 |
| 001 | 11ad+, π/4-64QAM, CR=7/8, La=7xL |
| 010 | 11ad+, π/4-64QAM, CR=7/8, La=7xL-1 |
| 011 | 11ad+, π/4-64QAM, CR=7/8, La=7xL-2 |
| 100 | 11ad+, π/4-64QAM, CR=7/8, La=7xL-3 |
| 101 | 11ad+, π/4-64QAM, CR=7/8, La=7xL-4 |
| 110 | 11ad+, π/4-64QAM, CR=7/8, La=7xL-5 |
| 111 | 11ad+, π/4-64QAM, CR=7/8, La=7xL-6 |

For MCS 7..9

| Value | Meaning |
| --- | --- |
| 00 | 11ad, π/4-QPSK |
| 01 | 11ad+, π/4-64QAM, La=3xL, CR as in MCS table |
| 10 | 11ad+, π/4-64QAM, La=3xL-1, CR as in MCS table |
| 11 | 11ad+, π/4-64QAM, La=3xL-2, CR as in MCS table |

FIG. 13

MODE INDICATION FOR WIRELESS DEVICES

CLAIM OF PRIORITY UNDER 35 U.S.C. § 119

The present Application for Patent claims benefit of U.S. Provisional Patent Application Ser. No. 62/279,637, filed Jan. 15, 2016, assigned to the assignee hereof and hereby expressly incorporated by reference herein.

TECHNICAL FIELD

Aspects of the present disclosure relate generally to wireless communications systems and, more particularly, to techniques for indicating an operating mode (e.g., using an enhanced modulation scheme) to wireless devices.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically comprises active and passive modules. The active modules (e.g., a power amplifier or other amplifiers) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

SUMMARY

Certain aspects of the present disclosure provide an apparatus for wireless communication. The apparatus generally includes a processing system configured to generate a frame having a header portion recognizable by first and second types of devices, and to select a first value of a scrambler field of the frame to indicate at least one of: whether another portion of the frame is encoded using an enhanced modulation scheme supported by the second type of devices but not supported by the first type of devices or a second value for use by a recipient of the frame to determine a length of the portion of the frame encoded using the enhanced modulation scheme; and a first interface configured to output the frame for transmission.

Certain aspects of the present disclosure provide an apparatus for wireless communication. The apparatus generally includes a first interface configured to obtain a frame; and a processing system configured to determine, based on a first value of a scrambler field of a header portion of the frame, at least one of: whether another portion of the frame is encoded using an enhanced modulation scheme or a second value to use to determine a length of the portion of the frame encoded using the enhanced modulation scheme, and to process the frame based on the determination.

Certain aspects of the present disclosure also provide various other apparatuses, methods, and computer readable media capable of performing (or causing an apparatus to perform) the operations described herein.

BRIEF DESCRIPTION OF THE DRAWINGS

FIGS. 6-13 illustrate example signaling mechanisms for indicating a mode of operation, in accordance with certain aspects of the present disclosure.

DETAILED DESCRIPTION

Figure 1:
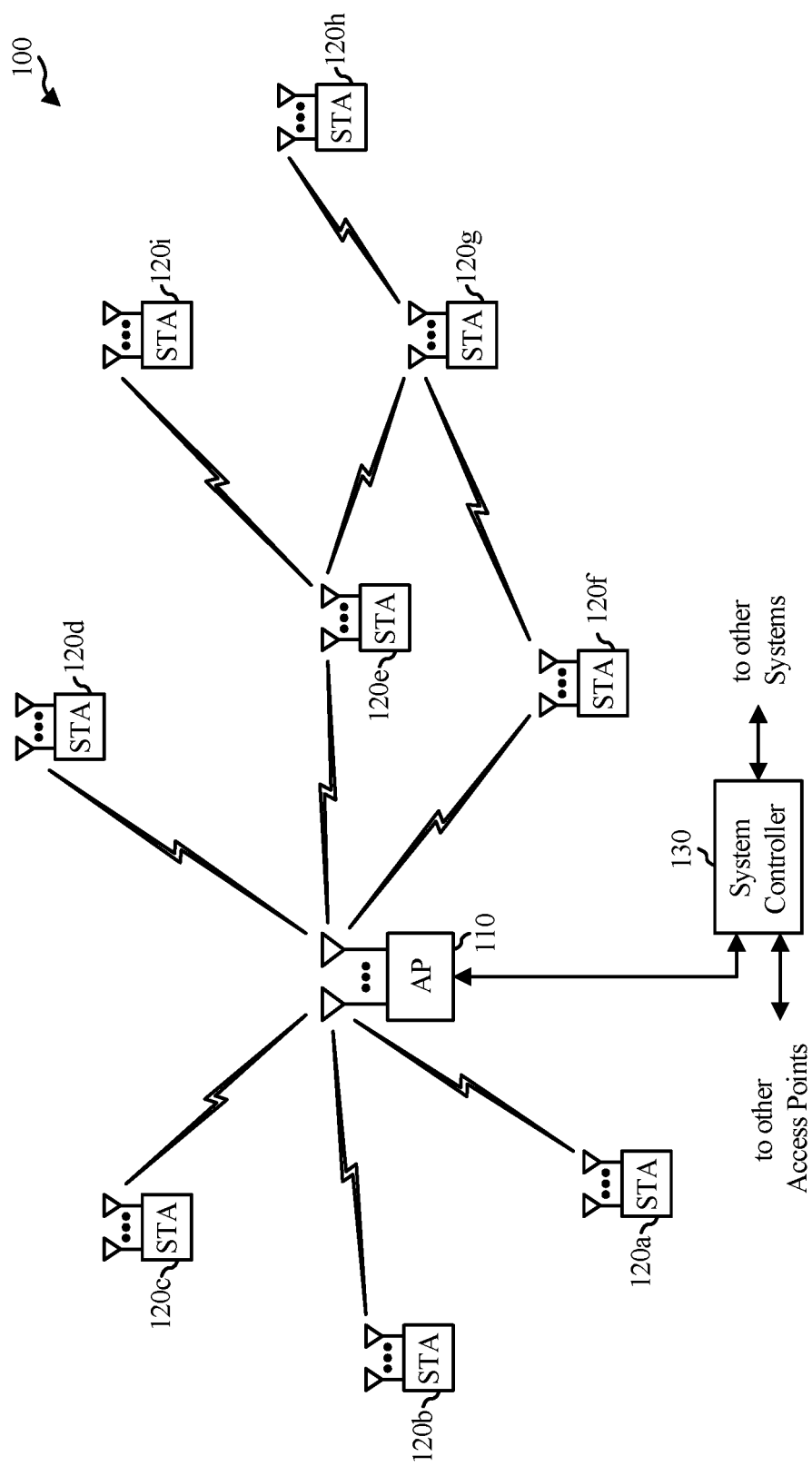
FIG. 1 illustrates a diagram of an example wireless communications network, in accordance with certain aspects of the present disclosure.

Certain aspects of the present disclosure provide techniques for providing an indication of an operating mode to a wireless device. The operating mode, for example, may be a mode in which an enhanced modulation scheme (e.g., not supported by legacy devices) may be used.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple STAs. A TDMA system may allow multiple STAs to share the same frequency channel by dividing the transmission signal into different time slots, each time slot being assigned to different STA. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA.

The teachings herein may be incorporated into (e.g., implemented within or performed by) a variety of wired or wireless apparatuses (e.g., nodes). In some aspects, a wireless node implemented in accordance with the teachings herein may comprise an access point or an STA.

An access point ("AP") may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with APs and STAs in which aspects of the present disclosure may be practiced. The MIMO system 100 may be a multiuser MIMO system (MU-MIMO). Although not illustrated in FIG. 1, another example wireless communication can be a single-input single-output (SISO) in which aspects of the present disclosure can be practiced.

For simplicity, only one access point 110 is shown in FIG. 1. An access point is generally a fixed station that communicates with the STAs and may also be referred to as a base station or some other terminology. A STA may be fixed or mobile and may also be referred to as a mobile station, a wireless device, or some other terminology. Access point 110 may communicate with one or more STAs 120 at any given moment on the downlink and uplink. The downlink (i.e., forward link) is the communication link from the access point to the STAs, and the uplink (i.e., reverse link) is the communication link from the STAs to the access point. A STA may also communicate peer-to-peer with another STA. A system controller 130 couples to and provides coordination and control for the access points.

While portions of the following disclosure will describe STAs 120 capable of communicating via Spatial Division Multiple Access (SDMA), for certain aspects, the STAs 120 may also include some STAs that do not support SDMA. Thus, for such aspects, an AP 110 may be configured to communicate with both SDMA and non-SDMA STAs. This approach may conveniently allow multiple versions of STAs ("legacy" stations) to remain deployed in an enterprise, extending their useful lifetime, while allowing newer SDMA STAs to be introduced as deemed appropriate.

In the example system 100, the access point 110 and STAs 120 can employ multiple transmit and multiple receive antennas for data transmission on the downlink and uplink. In a SISO system, the AP 110 and STAs 120 can employ only a single antenna for transmission and reception. Although not shown, other example wireless communications systems in which the aspects of the present disclosure can be deployed include a SISO system, MU-MIMO system, single carrier MIMO system, or single carrier MU-MIMO system. For downlink MIMO transmissions, $N_{ap}$ antennas of the access point 110 represent the multiple-input (MI) portion of MIMO, while a set of K STAs represent the multiple-output (MO) portion of MIMO. Conversely, for uplink MIMO transmissions, the set of K STAs represent the MI portion, while the $N_{ap}$ antennas of the access point 110 represent the MO portion. For pure SDMA, it is desired to have $N_{ap} \geq K \geq 1$ if the data symbol streams for the K STAs are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected STA transmits user-specific data to and/or receives user-specific data from the access point. In general, each selected STA may be equipped with one or multiple antennas (i.e., $N_{ut} \geq 1$). The K selected STAs can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each STA may be equipped with a single antenna (e.g., in order to keep costs down) or multiple antennas (e.g., where the additional cost can be supported). The system 100 may also be a TDMA system if the STAs 120 share the same frequency channel by dividing transmission/reception into different time slots, each time slot being assigned to different STA 120.

Figure 2:
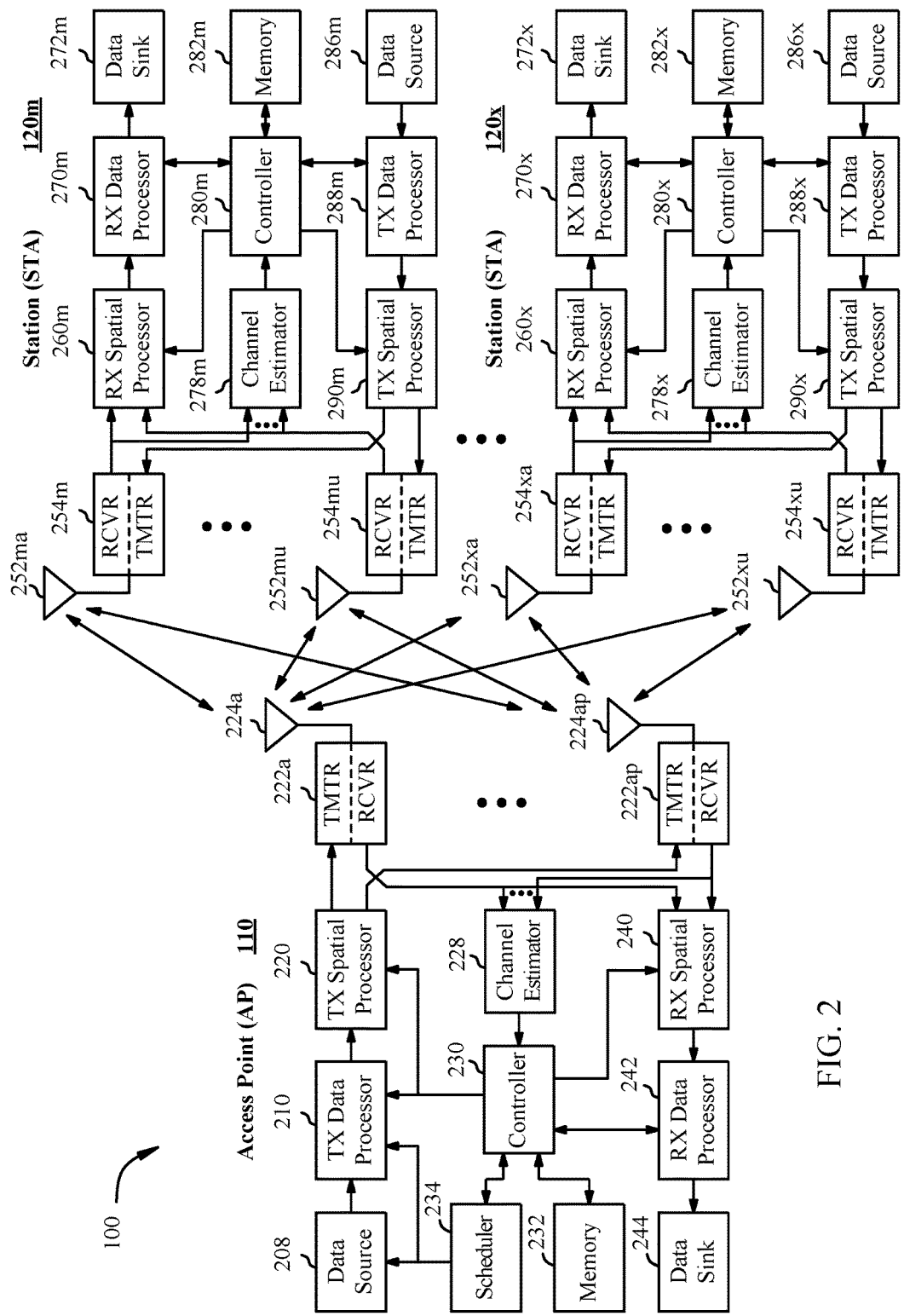
FIG. 2 illustrates a block diagram of an example access point and stations (STAs), in accordance with certain aspects of the present disclosure.

FIG. 2 illustrates a block diagram of access point 110 and two STAs 120*m* and 120*x* in MIMO system 100 in which aspects of the present disclosure may be practiced. As discussed above, the rotation determination techniques discussed herein may be practiced by an access point 110 or STA 120.

The access point 110 is equipped with $N_t$ antennas 224*a* through 224*t*. STA 120*m* is equipped with $N_{ut,m}$ antennas 252*ma* through 252*mu*, and STA 120*x* is equipped with $N_{ut,x}$ antennas 252*xa* through 252*xu*. The access point 110 is a transmitting entity for the downlink and a receiving entity for the uplink. Each STA 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, Nup STAs are selected for simultaneous transmission on the uplink, Ndn STAs are selected for simultaneous transmission on the downlink, Nup may or may not be equal to Ndn, and Nup and Ndn may be static values or can change for each scheduling interval. The beam-steering or some other spatial processing technique may be used at the access point and STA.

On the uplink, at each STA 120 selected for uplink transmission, a transmit (TX) data processor 288 receives traffic data from a data source 286 and control data from a controller 280. TX data processor 288 processes (e.g., encodes, interleaves, and modulates) the traffic data for the STA based on the coding and modulation schemes associated with the rate selected for the STA and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

Nup STAs may be scheduled for simultaneous transmission on the uplink. Each of these STAs performs spatial processing on its data symbol stream and transmits its set of transmit symbol streams on the uplink to the access point.

At access point 110, $N_{ap}$ antennas 224*a* through 224*ap* receive the uplink signals from all Nup STAs transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective STA. An RX data processor 242 processes (e.g., demodulates, deinterleaves, and decodes) each recovered uplink data symbol stream in accordance with the rate used for that stream to obtain decoded data. The decoded data for each STA may be provided to a data sink 244 for storage and/or a controller 230 for further processing.

On the downlink, at access point 110, a TX data processor 210 receives traffic data from a data source 208 for Ndn STAs scheduled for downlink transmission, control data from a controller 230, and possibly other data from a scheduler 234. The various types of data may be sent on different transport channels. TX data processor 210 processes (e.g., encodes, interleaves, and modulates) the traffic data for each STA based on the rate selected for that STA. TX data processor 210 provides Ndn downlink data symbol streams for the Ndn STAs. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the STAs.

At each STA 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the STA. The receiver spatial processing is performed in accordance with the CCMI, MMSE or some other technique. An RX data processor 270 processes (e.g., demodulates, deinterleaves and decodes) the recovered downlink data symbol stream to obtain decoded data for the STA.

At each STA 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each STA typically derives the spatial filter matrix for the STA based on the downlink channel response matrix Hdn,m for that STA. Controller 230 derives the spatial filter matrix for the access point based on the effective uplink channel response matrix Hup,eff. Controller 280 for each STA may send feedback information (e.g., the downlink and/or uplink eigenvectors, eigenvalues, SNR estimates, and so on) to the access point. Controllers 230 and 280 also control the operation of various processing units at access point 110 and STA 120, respectively.

According to certain aspects of the present disclosure, the various processors shown in FIG. 2 may direct the operation at an AP 110 and/or STA 120, respectively, to perform various techniques described herein, to determine relative rotation based on training signals and/or other processes for the techniques described herein.

Figure 3:
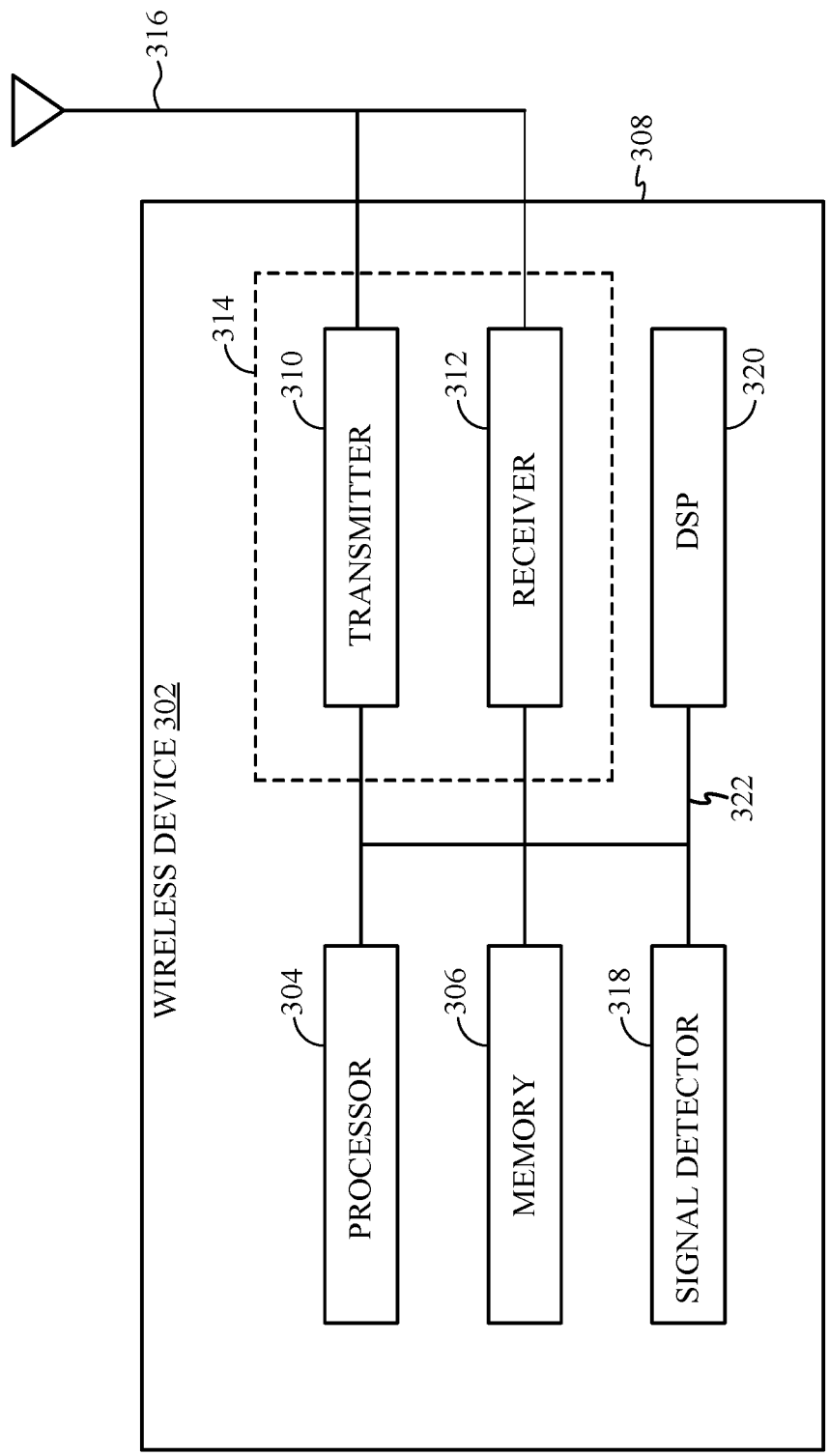
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a STA 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 typically performs logical and arithmetic operations based on program instructions stored within the memory 306. The instructions in the memory 306 may be executable to implement the methods described herein. Processor 304 may, for example, perform or direct operations 600 in FIG. 6 to determine relative rotation and/or other processes for the techniques described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers. The transceiver can use a single antenna (as shown) for both transmitting and receiving or can use different antennas (not shown) for transmitting and receiving.

The wireless node 302 may use multiple transmitters, multiple receivers, and/or multiple transceivers in communicating with a WWAN and one or more WLANs. Additionally or alternatively, the wireless node 302 may communicate with a WWAN via a single transceiver 314 and retune the transceiver 314 (tune away from the WWAN) to communicate with one or more WLANs.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

Example Mechanism for Indicating an Operating Mode

As noted above, aspects of the present disclosure provide techniques that may allow for indication of an operating mode supported by some devices. The techniques may be applied to any type of wireless devices, for example, wireless devices utilizing orthogonal frequency division multiplexing (OFDM) and single carrier (SC) modulation, such as 802.11ad and 802.11ay devices. The operating mode may involve the use of what may be considered an enhanced modulation scheme because it is not supported by certain (so called "legacy") devices. As used herein, the term "legacy device" generally refers to a device that is compatible with an earlier standard or earlier version of a standard relative a "non-legacy" device that supports a later standard or later version of a standard. As such, non-legacy devices typically support one or more enhanced features relative to a legacy device. In various examples described herein, devices compatible with 802.11ad may be considered legacy devices, while devices compatible with 802.111ay may be considered non-legacy devices.

In some cases, non-legacy devices may support enhanced modulation and coding schemes (MCS) relative to legacy devices. For example, devices operating in accordance with certain standards, such as 802.11ad may not support 64QAM (and/or certain code rates, such as 5/8, 3/4 and 13/16). Adding a new constellation mode to an existing standard after devices are already in the market and certification is in place poses certain challenges. For example, it may be desirable to keep a same structure for a packet (or frame) but at the same time protect from legacy devices that will decode the header and need to know frame duration. Non-legacy devices, on the other hand, need to be able to determine the new payload length using the same header and determine the exact MCS and rate, ideally, using an existing header, to be able to process the remainder of the frame.

Certain aspects of the present disclosure allow for such mode indication using encoding of values in existing fields of a frame header portion (e.g., such as a scrambler field). In some cases, an operating mode supporting an enhanced modulation scheme (e.g., QAM 64) and/or new code rates (not supported by legacy devices) with certain modulation schemes (e.g., 7/8 or 13/16 code rates) may be indicated using the encoding techniques described herein.

Figure 4:
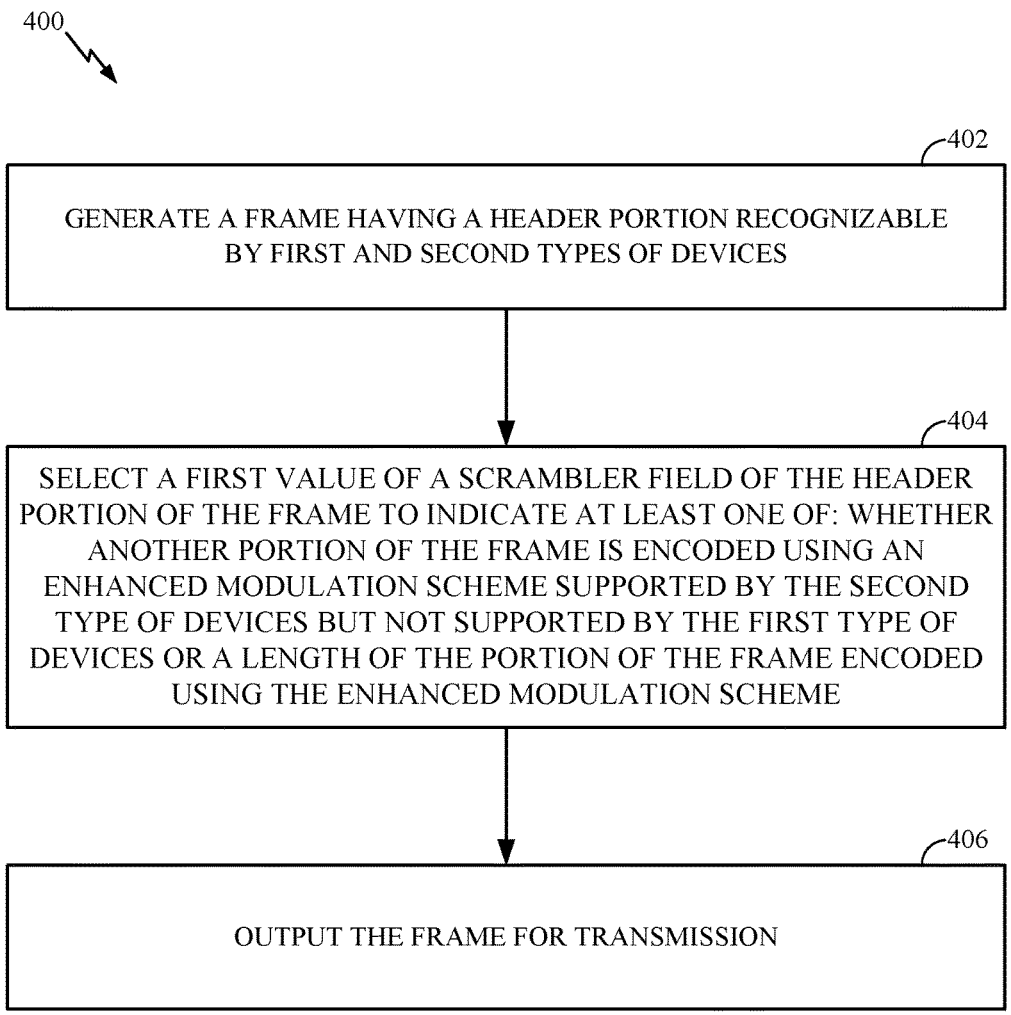
FIG. 4 illustrates example operations for wireless communications, according to certain aspects of the present disclosure.

FIG. 4 illustrates example operations 400 for wireless communications, according to certain aspects of the present disclosure. Operations 400 may be performed by any transmitting device (e.g., an AP or non-AP STA) that supports an enhanced modulation scheme and/or code rates.

Operations 400 begin, at 402, by generating a frame having a header portion recognizable by first and second types of devices (e.g., 802.11ad and 802.11ay devices, respectively).

At 404, a first value of a scrambler field of the frame is selected to indicate at least one of: whether another portion of the frame is encoded using an enhanced modulation scheme supported by the second type of devices but not supported by the first type of devices or a second value for use by a recipient of the frame to determine a length of the portion of the frame encoded using the enhanced modulation scheme. At 406, the frame is output for transmission.

Figure 5:
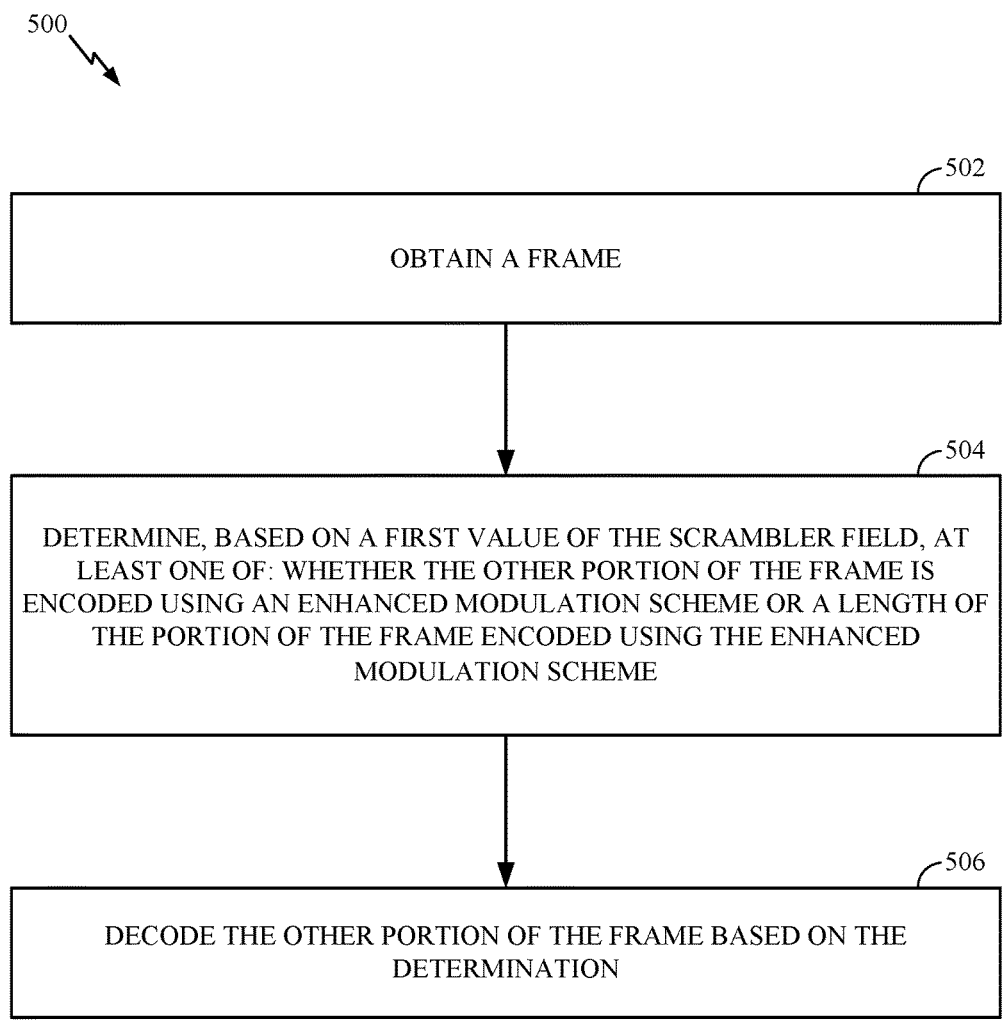
FIG. 5 illustrates example operations for wireless communications, according to certain aspects of the present disclosure.

FIG. 5 illustrates example operations 500 for wireless communications, according to certain aspects of the present disclosure. The operations may be considered complementary operations to operations 400 shown in FIG. 4. In other words, operations 500 may be performed (e.g., by a non-legacy device) to process a frame generated according to operations 400 described above.

As shown, operations 500 begin, at 502, by obtaining a frame. At 504, a determination is made, based on a first value of a scrambler field of a header portion of the frame, of at least one of: whether another portion of the frame is encoded using an enhanced modulation scheme or a second value to use to determine a length of the portion of the frame encoded using the enhanced modulation scheme. At 506, the frame is processed based on the determination.

Figure 6:

FIG. 6 illustrates a table 600 that provides examples of various options for signaling operating modes, in accordance with aspects of the present disclosure. As illustrated, some options may not use any (previously) reserved bits of header fields, while others may use only a single reserved bit.

In some cases, a value of a scrambler field may be selected to indicate whether an enhanced modulation scheme is used, a particular code rate (CR) used, or a particular combination thereof.

For example, in some cases a value selected for the scrambler field applied to a modulus function (e.g., modulo 3) may be used to indicate the length of a portion encoded with an enhanced modulation scheme (e.g., 64QAM), along with a legacy length field. As an example, since 64 QAM is 3 times QPSK, to get a length of an encoded portion of the frame, a recipient would just need to know how to adjust the length (e.g., 3×Legacy +0, 3×Legacy−1, or 3×Legacy−2). As an alternative, 2 LSBs may be used to indicate these 3 lengths.

For example, in some cases a value selected for the scrambler field applied to a modulus function (e.g., modulo 3) may be used to indicate the length of a portion encoded with an enhanced modulation scheme (e.g., 64QAM), along with a legacy length field. As an example, since 64 QAM is 3 times QPSK, to get a length of an encoded portion of the frame, a recipient would just need to know how to adjust the length (e.g., 3×Legacy +0, 3×Legacy- 1, or 3×Legacy-2). As an alternative, 2 LSBs may be used to indicate these 3 lengths.

As illustrated in FIG. 6, use of an enhanced modulation scheme may be signaled using an additional value of the scrambler field (e.g., with no additional bits from the scrambler field needed), which may avoid the use of reserved bits. In this case, the recipient may need to know whether the frame is coming from a legacy device (e.g., with an arbitrary scrambling seed), or from a non-legacy device (capable of supporting the enhanced modulation scheme) with coded seed.

In some cases, a combination of modulation scheme and code rate may be signaled via the scrambler field. For example, 64QAM with Code-Rate 7/8 may be signaled using an additional bit from the scrambler field. As will be described below, there are options for such signaling.

In cases where a reserved bit is used, the reserve bit of the Packet Type may be used, which might the packet from carrying beamforming training (TRN) fields. This may be acceptable as this bit is used only in one mode, and otherwise it is used for signaling the TRNs for the Beamforming. Since these will not be needed for the 64QAM (e.g., assuming this mode is used only after beamforming), this may be acceptable.

In some cases, a device capability for supporting enhanced modulation scheme (and indication of the same) may be indicated in the exchange of capability information. In some cases, the capability may be indicated via one of more fields of a Supported MCS Set subfield, such as that shown in FIG. 7.

Figure 7:
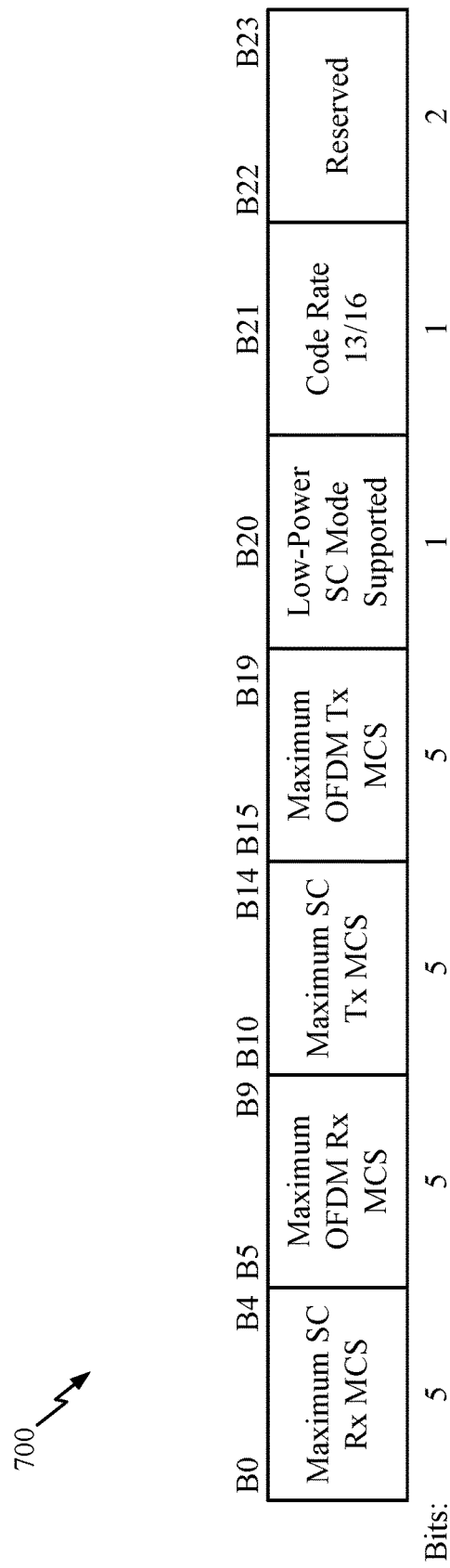

Depending on the capability supported, certain of the fields shown in FIG. 7 may be available for other use. For example, if OFDM is not used, OFDM fields may be used to signal supported modulation schemes. As examples, "Maximum OFDM Tx MCS" and "Maximum OFDM Rx MCS" may be used to signal 64QAM.

As in the example shown in FIG. 8, a value of '0' may indicate 64QAM is not supported. Non-zero values, on the other hand, may indicate particular code rates (supported in 64QAM).

Conversely, as shown in FIG. 9, if OFDM is used, single carrier (SC) fields may be used to signal supported modulation schemes. As illustrated, "Maximum SC Tx MCS" and "Maximum SC Rx MCS" may be used for such signaling.

As noted above, 64QAM modulation may be signaled by the 2 LSBs of the scrambler field, or modulo 3 with reserved bit (e.g., according to Options 1 and 2 in the Table of FIG. 6). In such cases, the "Scrambler Initialization" value may be essentially restricted to the upper 5 bits. The lower 2 bits will be used according to the table shown in FIG. 10. In case of the use of reserved bit, a modulo of the seed may be used (and not a fixed allocation of the 2 bits).

The 64QAM 7/8 case may be signaled by using QPSK with CR=3/4, MCS8. In such cases (e.g., according to Options 3 and 5 in the Table of FIG. 6), the "Scrambler Initialization" value may be restricted to the upper 3 bits. In such cases, the lower 4 bits may be used according to the table shown in FIG. 11. According to option 3, modulo "11" of the seed may be taken instead of allocating 4 bits.

The 64QAM 7/8 case may be signaled by using BPSK with CR=3/4, MCS4 (e.g., according to Options 4 and 6 in the Table of FIG. 6). For CR=5/8, 3/4, 13/16, a transmitter may use MCS 7,8,9 respectively, and set the scrambler 3 LSBs to a value: 1.3 (or modulo 3 instead of LSBs). The zero value may be for the QPSK modulation. For CR=7/8 the scrambler 3 LSBs may be set to a value: 1.7 (or modulo 7 instead of LSB). For MCS of 4, the "Scrambler Initialization" may be restricted to the upper 4 bits, while the lower 3 bits may be used according to the table shown in FIG. 12. Similarly, for MCS 7 . . . 9, the lower 2 bits may be used according to the table shown in FIG. 13.

In some cases, the signaling described herein may be used only after the stations exchange the capability information (and the devices know which fields are available for the signaling described herein). For example, only if both stations support SC-64QAM, the transmitter may be able to select one of the common available 64QAM modulations. In some cases, in all transmissions that involved the "double" MCS uses (MCS 7,8,9 or 4,7,8,9), the indication may follow the scrambler signaling (as described above). On the other hand, if 64QAM is not supported by the transmitter, no scrambler limitation is imposed.

Legacy devices may always have certain fields, such as "Maximum OFDM Tx MCS" and "Maximum OFDM Rx MCS" set to ZERO, or Maximum SC MCS set to 12 or below. STAs may exchange 64QAM frames only after they exchanged capabilities. This may provide for backward compatibility. For example, if a device is receiving a message that was not intended for them, then the header may be perfectly allowable, and the NAV may point to the actual transmission length. If this device attempts to decode the data but fails to do so, due to the 64QAM signaling, that is still acceptable, as the frame was not intended for that device.

Figure 4A:
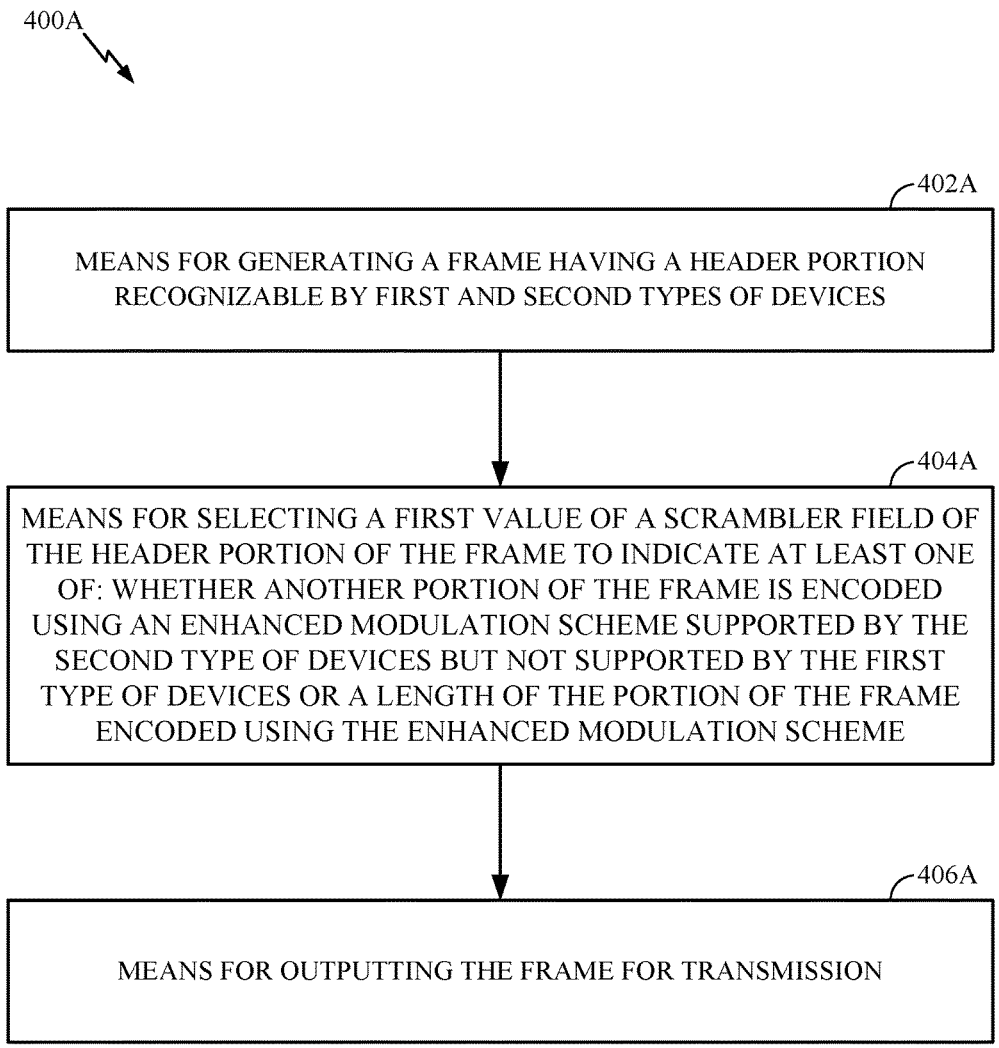
FIG. 4A illustrates example components capable of performing the operations shown in FIG. 4.
Figure 5A:
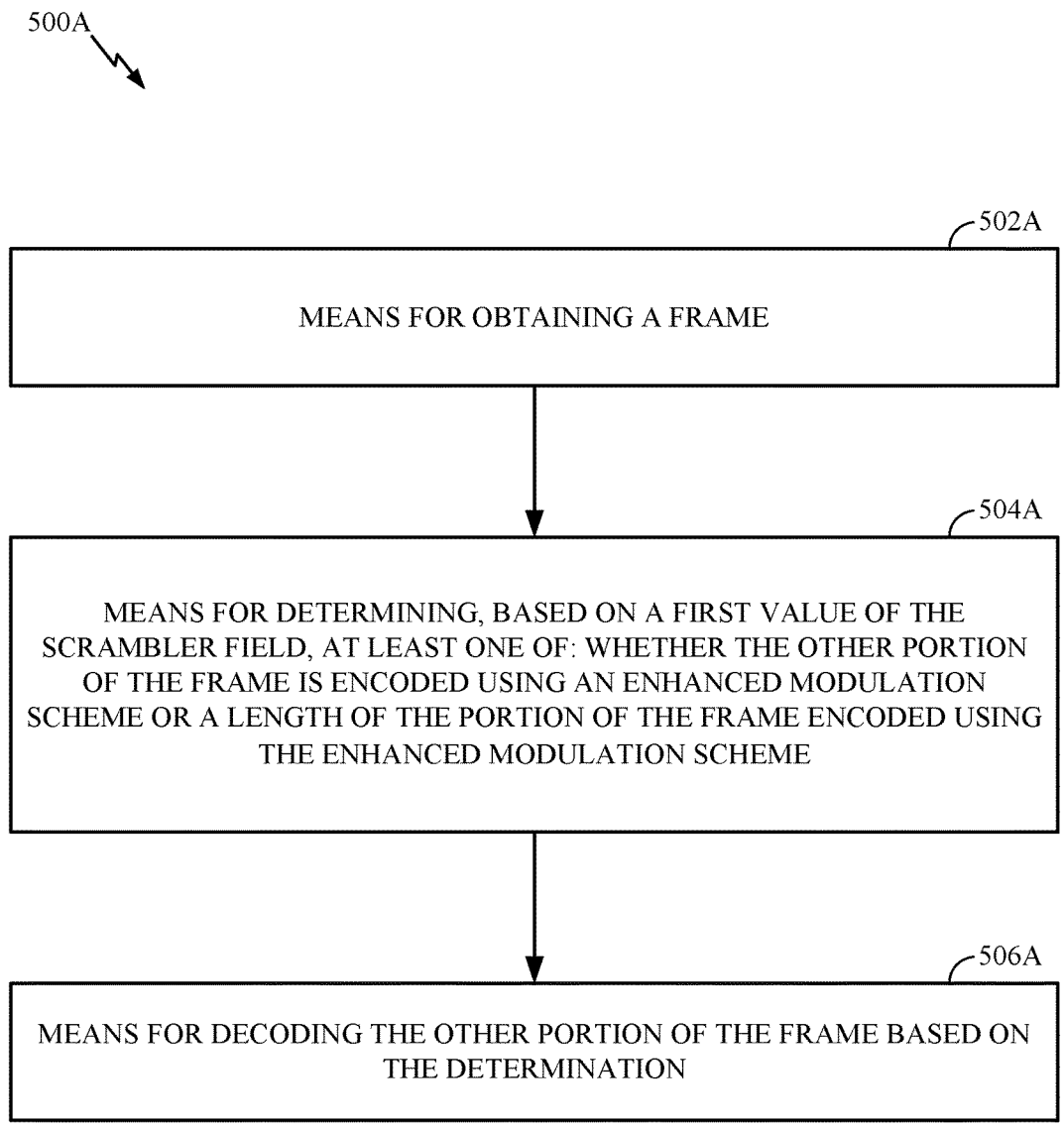
FIG. 5A illustrates example components capable of performing the operations shown in FIG. 5.

The various operations of methods described above may be performed by any suitable means capable of performing the corresponding functions. The means may include various hardware and/or software component(s) and/or module (s), including, but not limited to a circuit, an application specific integrated circuit (ASIC), or processor. Generally, where there are operations illustrated in figures, those operations may have corresponding counterpart means-plus-function components with similar numbering. For example, operations 400 illustrated in FIG. 4 correspond to means 400A illustrated in FIG. 4A and operations 500 illustrated in FIG. 5 correspond to means 500A illustrated in FIG. 5A.

Means for obtaining (e.g., receiving) may comprise a receiver (e.g., the receiver unit 254) and/or an antenna(s) 252 of the UT 120 illustrated in FIG. 2 or the receiver 312 and/or antenna(s) 316 depicted in FIG. 3. Means for transmitting and means for outputting may be a transmitter (e.g., the transmitter unit of transceiver 254) and/or an antenna(s) 252 of the STA 120 illustrated in FIG. 2 or the transmitter (e.g., the transmitter unit of transceiver 222) and/or antenna (s) 224 of access point 110 illustrated in FIG. 2.

Means for generating, means for detecting, means for determining, means for obtaining, means for selecting, means for adjusting, means for processing, means for re-encoding, means for estimating, means for processing, and/ or means for applying may include a processing system, which may include one or more processors such as processors 260, 270, 288, and 290 and/or the controller 280 of the UT 120 or the processor 304 and/or the DSP 320 portrayed in FIG. 3

In some cases, rather than actually transmitting a frame a device may have an interface to output a frame for transmission. For example, a processor may output a frame, via a bus interface, to a radio frequency (RF) front end for transmission. Similarly, rather than actually receiving a frame, a device may have an interface to obtain a frame received from another device. For example, a processor may obtain (or receive) a frame, via a bus interface, from an RF front end for reception.

According to certain aspects, such means may be implemented by processing systems configured to perform the corresponding functions by implementing various algorithms (e.g., in hardware or by executing software instructions) described above for determining rotation.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a STA 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a STA and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a STA and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to:
generate a frame having a first portion recognizable by first and second types of devices, wherein:
the first portion comprises a header of the frame;
the header comprises a scrambler field; and
the scrambler field includes a first number of bits indicating scrambler initialization information; and
select a value for representation by a second number of bits of the scrambler field of the header, wherein the value indicates at least one of:
whether a second portion of the frame is encoded using an enhanced modulation scheme supported by the second type of devices but not supported by the first type of devices; or
a length of the second portion of the frame encoded using the enhanced modulation scheme; and a first interface configured to output the frame for transmission.

2. The apparatus of claim 1, wherein the value provides an indication of both:
whether the second portion of the frame is encoded using the enhanced modulation scheme; and
the length of the portion of the frame encoded using the enhanced modulation scheme.

3. The apparatus of claim 1, wherein selection of the value is based on a modulus function to be applied to the value by a device of the first or second type.

4. The apparatus of claim 1, wherein:
the processing system is further configured to indicate, via at least one bit in the header, whether the second portion of the frame is encoded using the enhanced modulation scheme.

5. The apparatus of claim 1, wherein the value further indicates a code rate used when encoding the second portion of the frame using the enhanced modulation scheme.

6. The apparatus of claim 5, wherein:
the processing system is configured to select the code rate from a set of available code rates that includes a 13/16 code rate; and
the enhanced modulation scheme comprises 16QAM.

7. The apparatus of claim 5, wherein the processing system is further configured to select the code rate from a set of available code rates that includes a 7/8 code rate.

8. The apparatus of claim 1, further comprising:
a second interface configured to obtain, from a recipient device, capability information; and
wherein the processing system is further configured to:
determine the recipient device is the second type of device based on the capability information; and
in response to the determination, provide the value of the scrambler field in transmissions to the recipient device.

9. The apparatus of claim 1, wherein the enhanced modulation scheme comprises 64QAM.

10. The apparatus of claim 1, wherein the selected value is represented by two, three or four bits of the scrambler field.

11. An apparatus for wireless communications, comprising:
a first interface configured to obtain a frame having a first portion and a second portion, wherein:
the first portion comprises a header of the frame;
the header comprises a scrambler field; and
the scrambler field includes a first number of bits indicating scrambler initialization information;
a processing system configured to:
determine, based on a value represented by a second number of bits of the scrambler field, at least one of:
whether the second portion of the frame is encoded using an enhanced modulation scheme; or
a length of the second portion of the frame encoded using the enhanced modulation scheme; and
decode the second portion of the frame based on the determination.

12. The apparatus of claim 11, wherein the processing system is configured to determine, from the value, whether the second portion of the frame is encoded using the enhanced modulation scheme and the length of the portion of the frame encoded using the enhanced modulation scheme.

13. The apparatus of claim 11, wherein the processing system is configured to calculate the length by applying a modulus function to the value.

14. The apparatus of claim 11, wherein:
the processing system is further configured to determine, via at least one bit in the header, whether the second portion of the frame is encoded using the enhanced modulation scheme.

15. The apparatus of claim 11, wherein the processing system is configured to determine, based on the value, a code rate used to encode the second portion of the frame using the enhanced modulation scheme.

16. The apparatus of claim 11, wherein:
the processing system is further configured to generate a second frame providing an indication the apparatus is capable of supporting the enhanced modulation scheme; and
the apparatus further comprises a second interface to output the second frame for transmission.

17. The apparatus of claim 11, wherein the enhanced modulation scheme comprises 64QAM.

18. The apparatus of claim 11, further comprising:
a receiver configured to receive the frame, wherein the apparatus is configured as a wireless station.

19. The apparatus of claim 11, wherein the value is associated with two, three or four bits of the scrambler field.

20. A wireless station, comprising:
a processing system configured to:
generate a frame having a first portion recognizable by first and second types of devices, wherein:
the first portion comprises a header of the frame;
the header comprises a scrambler field; and
the scrambler field includes a first number of bits indicating scrambler initialization information; and
select a value for representation by a second number of the scrambler field of the header, wherein the value indicates at least one of:
whether a second portion of the frame is encoded using an enhanced modulation scheme supported by the second type of devices but not supported by the first type of devices, or
a length of the second portion of the frame encoded using the enhanced modulation scheme; and
a transmitter configured to transmit the frame.

21. A method for wireless communications, comprising:
generating a frame having a first portion recognizable by first and second types of devices, wherein:
the first portion comprises a header of the frame;
the header comprises a scrambler field; and
the scrambler field includes a first number of bits indicating scrambler initialization information; and
selecting a value for representation by a second number of bits of the scrambler field of the header, wherein the value indicates at least one of:
whether a second portion of the frame is encoded using an enhanced modulation scheme supported by the second type of devices but not supported by the first type of devices; or
a length of the second portion of the frame encoded using the enhanced modulation scheme; and
transmitting the frame.

22. An apparatus for wireless communications, comprising:
means for generating a frame having a first portion recognizable by first and second types of devices, wherein:
the first portion comprises a header of the frame;
the header comprises a scrambler field; and the scrambler field includes a first number of bits indicating scrambler initialization information; and means for selecting a value for representation by a second number of bits of the scrambler field of the header, wherein the value indicates at least one of:

whether a second portion of the frame is encoded using an enhanced modulation scheme supported by the second type of devices but not supported by the first type of devices; or a length of the second portion of the frame encoded using the enhanced modulation scheme; and means for transmitting the frame.

23. A non-transitory computer-readable medium for wireless communications, comprising:

instructions that, when executed by at least one processor, cause the at least one processor to:

generate a frame having a first portion recognizable by first and second types of devices, wherein:

the first portion comprises a header of the frame;

the header comprises a scrambler field; and the scrambler field includes a first number of bits indicating scrambler initialization information; and select a value for representation by a second number of bits of the scrambler field of the header, wherein the value indicates at least one of:

whether a second portion of the frame is encoded using an enhanced modulation scheme supported by the second type of devices but not supported by the first type of devices; or a length of the second portion of the frame encoded using the enhanced modulation scheme; and transmit the frame.

24. A method for wireless communications, comprising:

obtaining a frame having a first portion and a second portion, wherein:

the first portion comprises a header of the frame;

the header comprises a scrambler field; and the scrambler field includes a first number of bits indicating scrambler initialization information;

determining, based on a value represented by a second number of bits of the scrambler field, at least one of:

whether the second portion of the frame is encoded using an enhanced modulation scheme; or a length of the portion of the frame encoded using the enhanced modulation scheme; and decoding the second portion of the frame based on the determination.

25. An apparatus for wireless communications, comprising:

means for obtaining a frame having a first portion and a second portion, wherein:

the first portion comprises a header of the frame;

the header comprises a scrambler field; and the scrambler field includes a first number of bits indicating scrambler initialization information;

means for determining, based on a value represented by a second number of bits of the scrambler field, at least one of:

whether the second portion of the frame is encoded using an enhanced modulation scheme; or a length of the portion of the frame encoded using the enhanced modulation scheme; and means for decoding the second portion of the frame based on the determination.

26. A non-transitory computer-readable medium for wireless communications, comprising:

instructions that, when executed by at least one processor, cause the at least one processor to:

obtain a frame having a first portion and a second portion, wherein:

the first portion comprises a header of the frame;

the header comprises a scrambler field; and the scrambler field includes a first number of bits indicating scrambler initialization information;

determine, based on a value represented by a second number of bits of the scrambler field, at least one of:

whether the second portion of the frame is encoded using an enhanced modulation scheme; or a length of the portion of the frame encoded using the enhanced modulation scheme; and decode the second portion of the frame based on the determination.

* * * * *